United States Patent [19]

Yoo

[11] Patent Number: 5,758,754
[45] Date of Patent: Jun. 2, 1998

[54] SYSTEM FOR SENSING A MALFUNCTION OF A DRIVE TRAIN AND INITIATING AUTOMATIC BRAKING OF A VEHICLE

[75] Inventor: Jae-Woong Yoo, Seoul, Rep. of Korea

[73] Assignee: Kia Motors Corporation, Rep. of Korea

[21] Appl. No.: 674,416

[22] Filed: Jul. 2, 1996

[30] Foreign Application Priority Data

Apr. 16, 1996 [KR] Rep. of Korea .................. 1996-11418

[51] Int. Cl.⁶ .................................................. B60K 41/24
[52] U.S. Cl. ......................................... 192/13 R; 192/101
[58] Field of Search .................................. 192/4 A, 4 C, 192/13 R, 101, 103 C, 114 R, 66.22, 84.9; 477/904, 906; 180/285

[56] References Cited

U.S. PATENT DOCUMENTS

| | | | |
|---|---|---|---|
| 3,610,362 | 10/1971 | Toyama et al. | 192/13 R X |
| 3,637,057 | 1/1972 | Okamoto | 192/13 R |
| 3,863,730 | 2/1975 | Wakamatsu et al. | 192/13 R X |
| 4,825,989 | 5/1989 | Frigger | 192/13 R |
| 4,934,497 | 6/1990 | Ishizeki et al. | 192/13 R |

*Primary Examiner*—Richard M. Lorence
*Attorney, Agent, or Firm*—Lowe Hauptman Gopstein & Berner LLP

[57] ABSTRACT

A system for sensing a malfunction of a drive train and initiating automatic braking of a vehicle comprises an ECU for receiving a signal from a brake pedal and a speed sensor and outputting a signal to a unlocking device, a hazard lamp and an automatic braking device. The unlocking device is mounted between the drive train and wheels of the vehicle to isolate the drive train from the wheels upon sensing of a malfunction of the drive train whereby the vehicle coasts, allowing the driver the opportunity to stop the vehicle, or initiating automatic braking of the vehicle if the driver fails to do so.

3 Claims, 4 Drawing Sheets

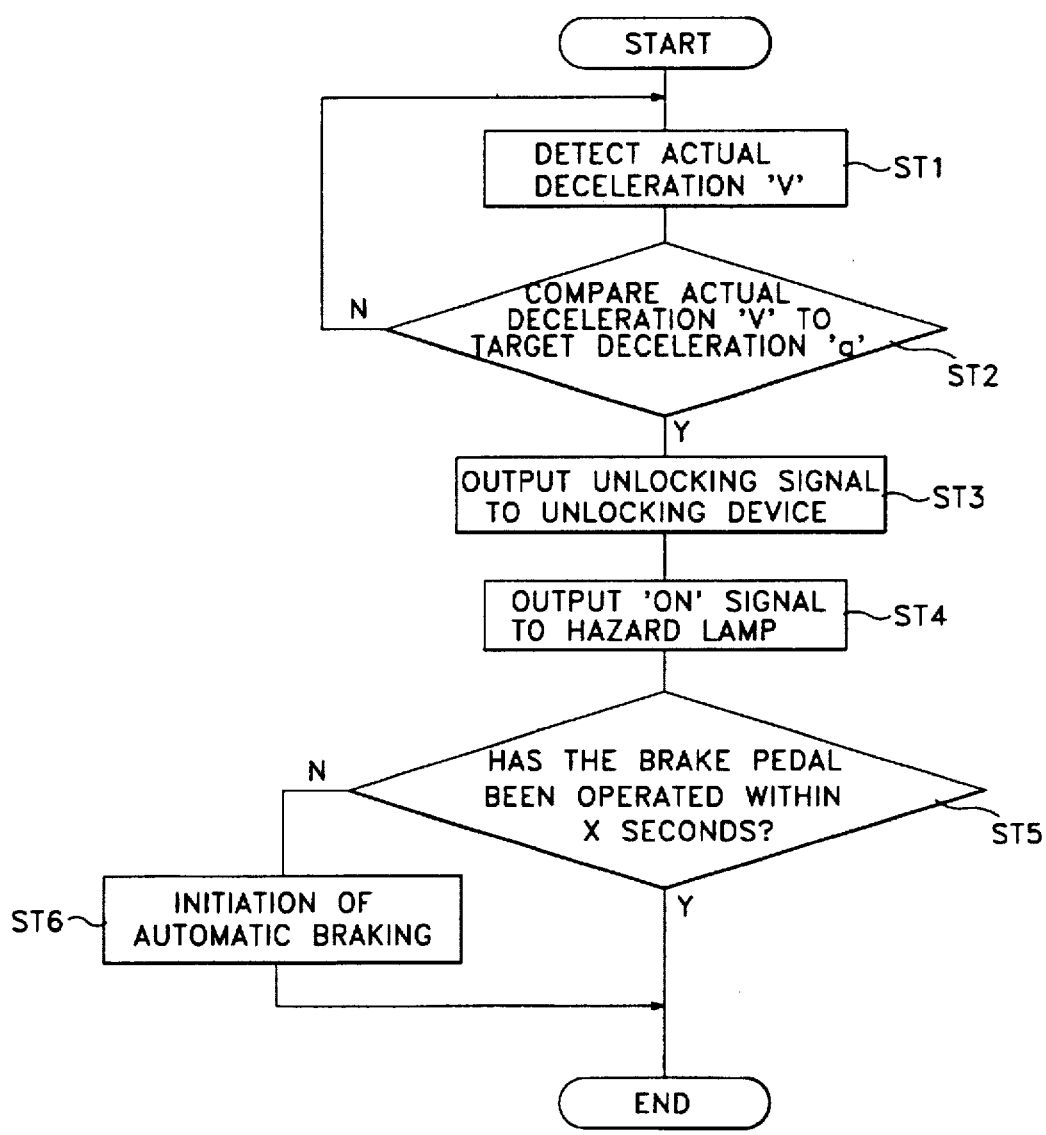

ent invention comprises an ECU 1 which
SYSTEM FOR SENSING A MALFUNCTION OF A DRIVE TRAIN AND INITIATING AUTOMATIC BRAKING OF A VEHICLE

FIELD OF THE INVENTION

The present invention relates to a system for sensing malfunction of a drive train and initiating automatic braking of a vehicle.

PRIOR ART

When a malfunction occurs in a vehicle drive train, the wheels will lock, resulting in sudden stoppage of the vehicle. A malfunction may occur, for example, if a driver accidentally shifts to reverse gear while driving from the 3rd gear position in a manual transmission vehicle. The result is an abrupt lock-up of the drive train that causes the driver to suddenly lose control of the vehicle, resulting in an accident.

SUMMARY OF THE INVENTION

To resolve the above mentioned problem, the purpose of the present invention is to provide a system for sensing of drive train malfunction and initiating automatic braking of the vehicle wherein an unlocking device is mounted between the drive train and vehicle wheels to isolate the drive train from the wheel upon sensing drive train malfunction. As the drive train and wheel are isolated, the vehicle merely coasts, allowing the driver to safely stop the vehicle. If the driver does not react within a certain time period, automatic braking is initiated to prevent an accident.

The system for sensing drive train malfunction and initiating automatic vehicle braking in accordance with the present invention comprises: an ECU for receiving the signals from a brake pedal and a speed sensor, and for outputting a signal to an unlocking device, a hazard lamp and an automatic braking device. The unlocking device is mounted between the drive train and vehicle wheels to isolate the drive train from the wheels upon sensing the drive train malfunction.

BRIEF DESCRIPTION OF THE DRAWINGS

The embodiment of the present invention will be better understood with reference to the following description and the attached drawings wherein:

FIG. 5 is a flow chart showing the operation of the unlocking device for the drive train in accordance with the present invention.

DETAILED DESCRIPTION OF THE INVENTION

Figure 1:
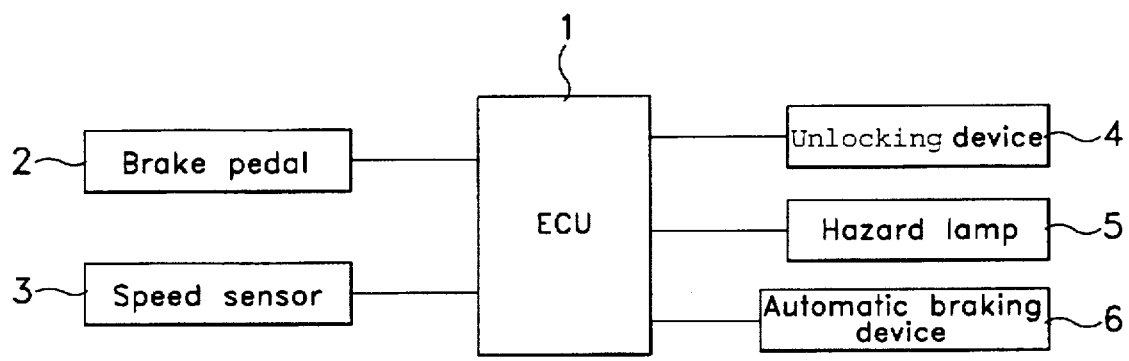
FIG. 1 is a block diagram of the system for sensing drive train malfunction and initiating automatic vehicle braking of vehicle in accordance with the present invention.

In FIG. 1, the system for sensing drive train malfunction and initiating automatic vehicle braking of vehicle in accordance with the present invention comprises an ECU 1 which receives signals from both a brake pedal 2 and a speed sensor 3 and outputs a signal to an unlocking device 4, a hazard lamp 5 and an automatic braking device 6.

The ECU 1 receives from brake pedal 2, a signal indicating whether the brake pedal is in operation and receives from the speed sensor 3, a signal indicating vehicle speed. From the signals of the speed sensor 3, ECU 1 then calculates a rate of deceleration.

Figure 2:
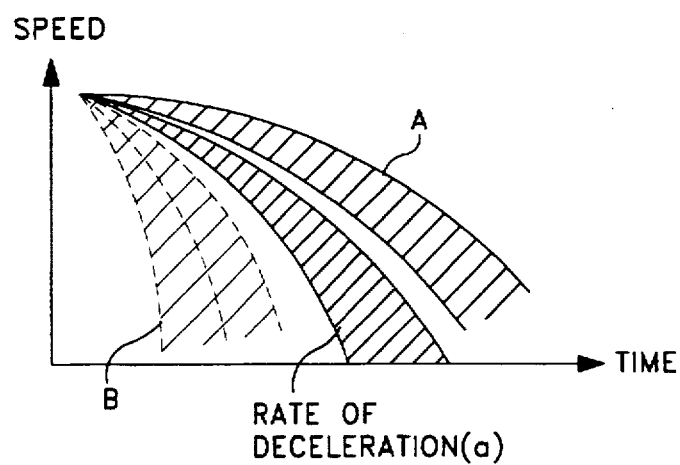
FIG. 2 is a graph showing the rate of deceleration resulting from drive train malfunction of the vehicle.

In FIG. 2, the rates of deceleration are shown. The general rate of deceleration is indicated by portion A for which the rate of deceleration is small and the rate of deceleration as a result of drive train malfunction is indicated by portion B for which the rate of deceleration is large. The target rate of deceleration(a) is selected between the portions A and B in accordance with the present invention.

Figure 3A:
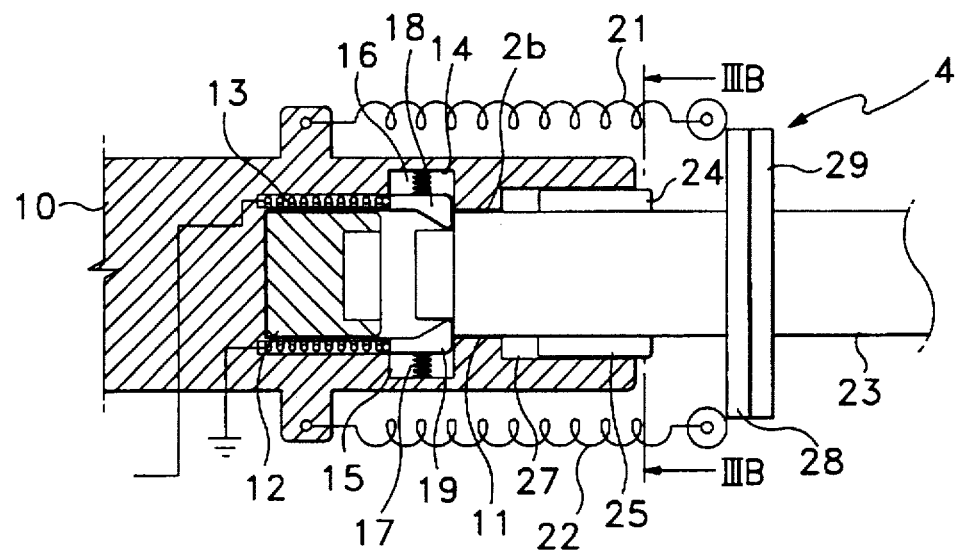
FIG. 3A is a partial view showing the construction of the unlocking device for the drive train in accordance with the present invention.

In FIG. 3A, the construction of the unlocking device 4 is shown. A guide hole 11 is formed in a driving shaft 10 and a movable rod 12 is provided in the guide hole. A solenoid 13 is provided around the movable rod 12 and embedded in the driving shaft and immediately in front of the movable rod 12 grooves 14 and 15 are formed in the upper and lower portions of the driving shaft. In each of the respective grooves 14 and 15, latches 18 and 19 are provided that are attached to the shaft 10 and are pushed inwards into the guide hole 11 by springs 16 and 17. In a normal state, as shown in FIG. 3A, the movable rod 12 is located near the solenoid 13.

Further along the guide hole 11 towards the opening, a clutch 20 is provided. The clutch 20 is attached to the driving shaft 10 by springs 21 and 22 which act to pull the clutch 20 into the guide hole 11. The latches 18 and 19, however, block the clutch 20 and allow it to only partially enter into the hole 11.

Figure 3B:
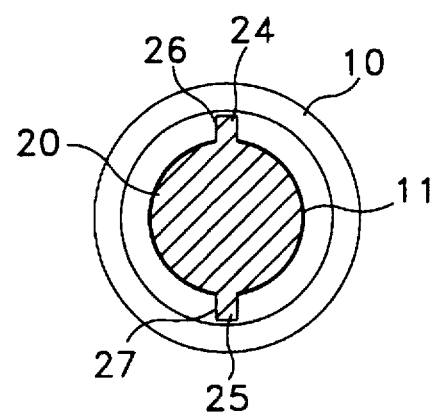
FIG. 3B is a cross-sectional view along a line IIIb—IIIb in FIG. 3A.

As shown in FIG. 3B, the clutch 20 is provided with an upper spline 24 and a lower spline 25. The splines 24 and 25 are inserted into the slots 26 and 27 formed in the guide hole 11. This arrangement of splines 24 and 25 allows driving power to be transferred from the driving shaft 10 to the clutch 20. In addition, referring back to FIG. 3A, the clutch 20 at one end is provided with a friction surface 28 and the friction surface 28 contacts another friction surface 29 of a wheel 23. The contact between the two friction surfaces 28, and 29 enables the driving power to be transferred from the clutch 20 to the wheel 23.

Figure 4A:
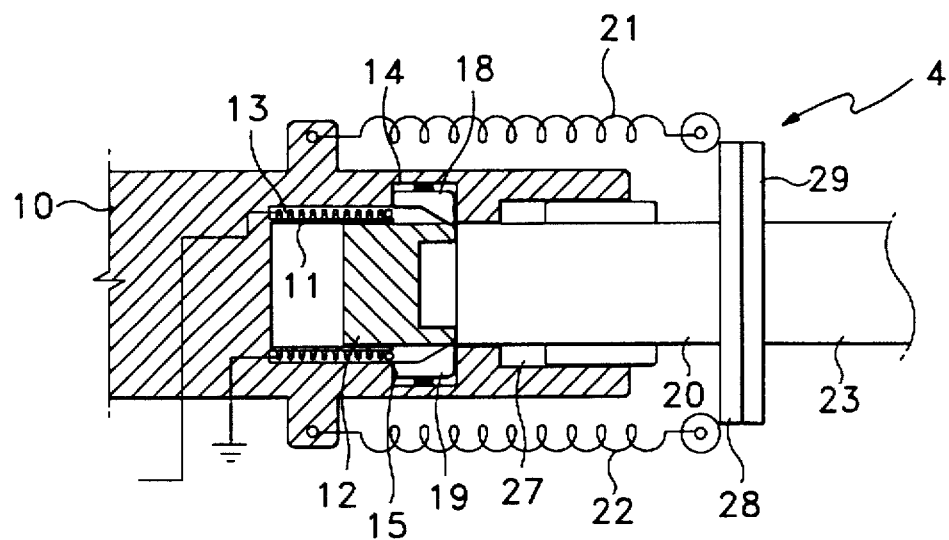
FIGS. 4A and 4B are explanatory views showing the operation of the unlocking device for the drive train in accordance with the present invention.
Figure 4B:
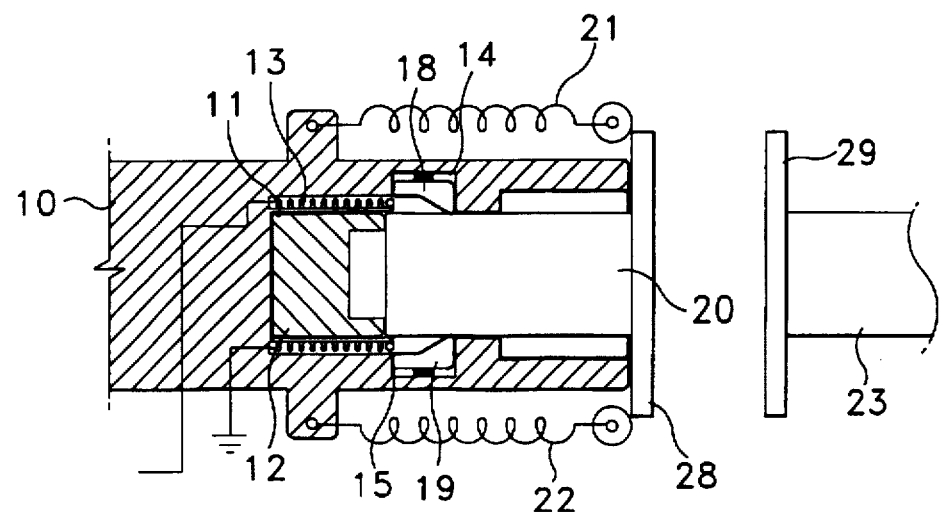

In FIGS. 4A and 4B, the operation of the unlocking device for the drive train is shown. Upon detection of a malfunction in the drive train, the unlocking device 4 receives a releasing signal from the ECU 1 and the solenoid 13 is magnetized to advance the movable rod 12 as shown in FIG. 4A.

As the movable rod 12 is advanced, it pushes back the latches 18 and 19 into their respective grooves 14 and 15, before contacting the clutch 20. After contact, the clutch 20 moves into the guide hole 11 by the pull of the springs 21 and 22 as it is no longer blocked by the latches 18 and 19. Accordingly, the movable rod 12 is also carried back in the guide hole 11 by the movement of the clutch. At this point, as shown in FIG. 4B, the friction surface 28 of the clutch 20 is no longer in contact with the friction surface 29 of the wheel 23. Thus driving power is no longer transferred from the driving shaft 10 to the wheel 23.

FIG. 5 is a flow chart showing the operation of the unlocking device for the drive train in accordance with the present invention. In ST1, the ECU 1 detects the actual rate of deceleration V and in ST2, compares it to the target rate of deceleration(a). If the actual rate of deceleration V is higher than the target rate of deceleration(a), it is determined that there is a malfunction of the drive train. Upon detection of the malfunction, the ECU 1 outputs a releasing signal to the unlocking device 4 to isolate the driving shaft 10 from the wheel 23 in ST3 and also outputs a signal to the hazard lamp 5 to turn "ON" in ST4. In addition, the lighting of the hazard lamp 5 is accompanied by activation of a warning sound.

Thereafter, in ST5, the ECU 1 detects whether the brake pedal 2 is operated within X seconds that is set as a delay time before automatic braking of the vehicle is initiated. If the brake pedal 2 is not operated within the set period of time, the automatic braking is initiated in ST6. The automatic braking is also adjusted according to the vehicle speed so that the vehicle may stop safely.

In accordance with the present invention, when a malfunction in the drive train is detected, the unlocking device is operated. The drive shaft 10 is isolated from the wheel 23 causing the vehicle to merely coast and allowing the driver time and control to safely stop the vehicle. In the case that the driver does not or cannot react within a certain time period for whatever reason, the automatic braking is initiated so as to prevent an accident.

What is claimed is:

1. A system for sensing malfunction of a drive train and initiating automatic braking of a vehicle comprising;

an unlocking device mounted between a drive train and wheels of the vehicle to isolate the drive train from the wheels upon sensing a malfunction of the drive train, an ECU for receiving the signal from both a vehicle brake pedal and a speed sensor and outputting a signal indicative of a malfunction in the drive train to disconnect the wheels from the drive team, said ECU also outputting a signal to activate a hazard lamp and an automatic brake under certain conditions; and wherein said unlocking device includes a driving shaft having a guide hole formed therein; grooves formed at upper and lower portions of the driving shaft; a movable rod disposed in the guide hole; a solenoid provided around the movable rod; latches provided adjacent each of the respective grooves; and a clutch extending from the guide hole and being attached to the driving shaft by springs which act to pull the clutch into the guide hole, said clutch being blocked by the latches and thereby allowed to enter only part way into the guide hole, wherein driving power of the drive train is transferred from the driving shaft to the clutch by means of splines formed on upper and lower clutch portions that fit into slots formed in the guide hole of the driving shaft, and driving power is transferred from the clutch to the wheel by means of contact between friction surfaces provided at the ends of the clutch and the wheel.

2. The system of claim 1, wherein the ECU receives the signal indicative of vehicle speed from the speed sensor, calculates a rate of deceleration and determines whether the calculated rate of deceleration is greater than a predetermined target rate of deceleration.

3. The system of claim 1, wherein the unlocking device receives the releasing signal from the ECU upon detection of a malfunction of the drive train which thereby magnetizes the solenoid to advance the movable rod into contact with the latches, causing the latches to enter into their respective grooves;

said movable rod also contacting with the clutch;

the clutch being operable to retract further into the guide hole by the pull of the springs past the latches now pushed back into their respective grooves;

said movable rod being simultaneously retracted further in the guide hole by the movement of the clutch; and said friction surface of the clutch thereby carried out of contact with the friction surface of the wheel so that driving power of the driving shaft is no longer transferred to the wheel.

* * * * *